Oct. 3, 1967  H. S. J. PIJLS  3,345,145
AUXILIARY MEMBER OF A COMPOSITE FOIL FOR JOINING TWO OBJECTS
OF DIFFERENT COEFFICIENTS OF THERMAL EXPANSION
Filed March 3, 1964

INVENTOR.
HERMANUS S.J. PIJLS
BY
AGENT

United States Patent Office 3,345,145
Patented Oct. 3, 1967

3,345,145
AUXILIARY MEMBER OF A COMPOSITE FOIL FOR JOINING TWO OBJECTS OF DIFFERENT COEFFICIENTS OF THERMAL EXPANSION
Hermanus Stephanus Josephus Pijls, Emmasingel, Eindhoven, Netherlands, assignor to North American Philips Company, Inc., New York, N.Y., a corporation of Delaware
Filed Mar. 3, 1964, Ser. No. 349,125
Claims priority, application Netherlands, Mar. 5, 1963, 289,812
4 Claims. (Cl. 29—183.5)

ABSTRACT OF THE DISCLOSURE

Auxiliary member useful for joining two objects of different coefficients of thermal expansion, said auxiliary member being a metal foil which is capable of creeping under small loads coated on both sides with metal films which adhere to thermohardening glue. An example is a lead tin alloy foil coated on both sides with an inner film of copper and an outer film of nickel. This abstract is not intended to be a description of the invention defined by the claims.

---

The invention relates to a method of manufacturing a laminated intermediate unit and to the use thereof in a method of connecting objects made of materials having different coefficients of expansion by means of a thermosetting glue and to objects connected by means of such an intermediate unit with the use of a thermo-setting glue.

It is often necessary in engineering to connect objects made of materials having different coefficients of expansion. If for making the connection a glue is chosen which hardens at an elevated temperature, for example above 150° C., such great stresses may occur in the objects upon cooling that cracks result in the object to be connected together. It is known that such stresses may be decreased by providing between the two objects to be connected an intermediate unit in the form of an intermediate layer made from a material having a coefficient of expansion which lies between the coefficients of expansion of the materials of which the objects are constituted. However, to arrive at a satisfactory result, the intermediate layer must be fairly thick, for example of 10 mms. or more which may technically cause many difficulties. Tests have revealed that stresses occur in the material having the lower coefficient of expansion with the use of a glue hardening at an elevated temperature. If this material has only a low tensile strength, such as many ceramic materials, these stresses may cause cracks a few millimetres from glue seam. This phenomenon occurs more particularly if a ceramic object of great thickness is secured to a thin metal plate having a thickness of, for example, from 1 to 3 mms.

In the copending patent application Ser. No. 323,317 filed Nov. 13, 1963, now Patent 3,283,401, it has already been stated and described that the use of laminated auxiliary members of suitable shape and structure can prevent the occurrence of permanent stresses, in particular in the last-mentioned cases. This idea is based on the recognition of the fact that after cooling, no permanent stresses will subsist in the objects joined together by means of glue at elevated temperature, if provision is made between the objects of a layer of a material which is capable of creeping under the influence of the forces occurring upon cooling of the glued joint. It was found that this can be realized in practice by the use of a laminated auxiliary member consisting of two or more metal foils or thin metal plates between which provision is made of a layer connected thereto and made of a material which already starts creeping at normal temperatures under a load of approximately 1 kg./cm.$^2$ or less, which loads may occur upon gluing. Such metals are, for example, lead, tin, zinc, bismuth and a few alloys of these metals, such as soldering alloys consisting of lead and tin.

It has been found that the use of an auxiliary member consisting of two metal plates or metal foils soldered to each other by means of a lead-tin solder already yielded excellent results. Difficulties were involved, however, in the manufacture of the auxiliary members required for the method, since it was found in practice that with the application of the layer of solder between the plates or foils, the formation of gas occlusions cannot always be avoided. These gas occlusions cannot be removed and after the manufacture their presence is not apparent from the auxiliary member. However, their presence appears from the fairly weak joint between the objects joined together with the use of the auxiliary member and from the bad energy transmission of these auxiliary members with ultrasonic transducers and the uneven load thereof. This may result in a high reject percentage.

The present invention has for its object to provide a method of manufacturing and using a laminated auxiliary member which does not present the said difficulties.

According to the invention, such an auxiliary member is obtained in that both sides of a foil of a metal which starts creeping at normal temperature already under a small load are coated chemically or by electrodeposition with a film of a metal to which the thermo-hardening glue adheres satisfactorily. Metals which start creeping at a normal temperature already under a small load, for example in the order of 1 kg./cm.$^2$, are, for example, lead, tin, zinc, bismuth and a few alloys of these metals, in particular eutectic lead-tin solder alloys.

The thickness of the plate or foil in itself is not very critical. For practical reasons, it is preferable, however, to choose the thickness to be not lower than 0.1 mm. Foils having a smaller thickness are difficult to handle. The maximum thickness may be chosen to be up to 1 mm. without any objection. A thickness exceeding 0.20 mm. is generally of little use, however, and may even be disadvantageous in certain cases, as a result of the occurrence of energy losses in the layer.

According to methods as such in the art of coating by known electrodeposition and chemical technology, both sides of the metal foil are provided with a thin film of one or more metals to which the thermo-hardening glue to be used adheres satisfactorily. Such metals are, for example, if use is made of a glue on the basis of ethoxylin resin; copper, nickel, chromium, aluminium, silver and the like.

In many cases, the data required for a given glue as regards the adhesion to metals can be derived in a simple manner from the literature of the art and from the publications in the form of leaflets and the like accompanying commercially available glues. If this is not the case, the required data can be derived from a number of simple tests and measurements. Glues which may be used for example Bondmaster 611 a product of Rubber and Asbestos Corporation, U.S.A., Armstrong A1 a product of Armstrong Products Corporation, U.S.A., Araldite AT1 a product sold by Ciba (A.R.L.) Ltd., Great Britain, these are usually two component systems consisting of an epoxy type resin formulation with an inorganic filler and an amine type catalyst, they usually melt at 80–100° C. or are viscous fluids, which set upon heating. Also other glues adhering tenaciously to metals could be used such as for example polyester resin formulations.

Not every metal of this group can be applied equally readily by electrodeposition to a foil of a lead-tin alloy (40/60). If, however, a copper film is first applied, the latter can be coated in a simple manner with a nickel film.

Chromium is very suitable to be applied to such a substratum. Besides electrodeposition methods, it is also possible, of course, to use other methods, such as, for example, the so-called method of electroless nickel-plating. In general, both with electrodeposition methods and with other methods, standard technologies are concerned which may be derived from the literature of the art and which do not need further description within the scope of the present invention.

In order that the invention may be readily carried into effect, it will now be described more fully, by way of example, with reference to the accompanying drawing, in which.

Figure 1:
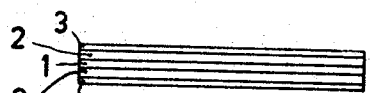
FIGS. 1 and 2 are perspective views of auxiliary members which may be used for securing objects having a rectangular bottom face.

The auxiliary member shown in FIG. 1 consists of a metal foil 1 of a lead-tin alloy (40/60) the thickness of which is reduced by rolling to 0.15 mm. Both sides of the foil are first provided by electrodeposition with a copper film 2 having a thickness of approximately 18 microns and subsequently with a nickel film 3 having a thickness of approximately 7 microns by electrolytically depositing copper onto the lead-tin foil in an aqueous solution of a copper salt such as copper sulphate, thereupon a nickel-film is deposited in the same way on the coppered lead-tin foil in an aqueous solution of a nickel salt.

Figure 2:
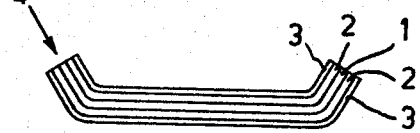

In principle, the structure of the auxiliary member shown in FIG. 2 is equal to that of the auxiliary member shown in FIG. 1, with the exception that the metal foil is provided with an upright edge 4. The upright edge 4 can prevent glue which is applied to the upper layer 3 from flowing away in all directions. The auxiliary members may have an arbitrary shape which is matched to the objects to be interconnected by means of glue. They may have a circular, a rectangular or a differently shaped surface. The auxiliary members may be used in particular for interconnecting objects which can be directly joined only with difficulty or cannot at all be joined by soldering or gluing or in any other way.

With reference to an example in which an object of ceramic material and a metal are joined together, the invention will now be described in greater detail.

Figure 3:
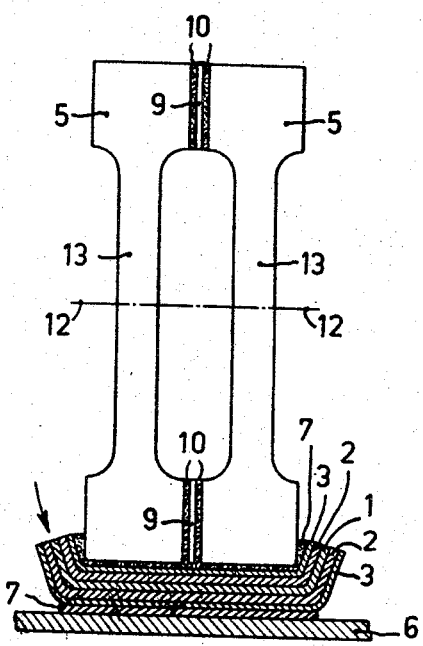
FIG. 3 is a cross-section at natural size of a ceramic object connected to a metal plate in accordance with the invention.

FIG. 3 is a cross-section of a so-called transducer which is used to convert electrical energy into mechanical energy, and conversely. In this case, the transducer consists of two members 5 of Ferroxcube having a length of 97 mms. between which thin plates 9 of Ferroxdure are disposed. The members 5 and the plates 9 are interconnected by means of glue joints 10. The assembly is glued to a metal surface 6, for example, the bottom of a stainless steel container (thickness of the metal 2 mms.) with the use of an auxiliary member as shown in FIG. 2. A layer of glue 7 is disposed between the auxiliary member and the transducer. Between the auxiliary member and the metal plate 6, there is also provided a layer of glue 8 which consists, for example, of the same glue as that used for the layer of glue 7. It is also possible to use different types of glue for the two layers of glue.

An essential component of ultrasonic purifying apparatus is the so-called transducer which serves to convert the electric power supplied into mechanical vibrations. The element which carries out this conversion often consists of a ceramic material, for example, Ferroxcube. In order to obtain a satisfactory yield and ready handling, one or more of these elements are glued to or in a trough or vessel consisting of erosion-proof and chemically resistant material, mostly stainless steel. In this construction, the layer of glue is exposed to high varying forces (10–50 kgs./cm.$^2$) of high frequencies (20–40 kc./s.).

In order to dissipate a minimum of power as a result of mechanical losses, the layer of glue must be thin and must consist of a hard glue. It is further desirable that the layer of glue maintains its strength up to approximately 100° C., since it is often required to heat the purifying liquid to this temperature. Warm-hardening glues satisfying these requirements can be obtained on the basis of ethoxylin resins and are commercially available. The suitable hardening temperature for these glues generally lies between 150° C. and 200° C.

However, upon cooling from the hardening temperature of the glue (generally 150° C.), the difference between the coefficients of expansion of Ferroxcube ($7 \times 10^{-6}$) and stainless steel ($16.2 \times 10^{-6}$) results, in such high stresses in the Ferroxcube that it often breaks a few millimetres above the layer of glue.

By the use of an auxiliary member shown in FIG. 1 or FIG. 2 of the indicated composition provided with a layer of glue on the basis of ethoxylin resin Araldite AT1 which was manufactured by the method in accordance with the invention, it was achieved that also when the glue was hardened at approximately 150° C. and the assembly then was cooled to —80° C., cracks did no longer occur in the Ferroxcube body. In the finished transducer, provision is made of coils (not shown) around the parts 13 of the member 5; under the influence of an electric alternating current of high frequency produced in these coils, the length of the members 5 is alternately increased and decreased. It was found that a given lengthening or shortening could be two times greater than with a joint glued in a different manner. Fracture, if any, as a result of overload occurs in the centre 12 of the members 5, from which it is apparent that hardly any stresses as a result of the gluing operation are left in the members 5. The tensile strength on fracture of the joint was found generally to lie between 15 and 20 kgs./mm.$^2$. In many cases, fracture occurred in the layer of glue.

The use of auxiliary members of other metals, such as, for example, lead may yield equally satisfactory results.

The joining operation can be carried out in a simple manner by melting the required quantity of glue in the auxiliary member and by providing the transducer, whereupon, if desired, the glue is hardened. Subsequently, the layer of glue 8 is provided between the auxiliary member and the metal plate 6 and the assembly is heated to the temperature required for hardening the glue.

Figure 4:
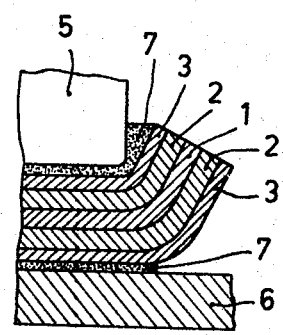
FIG. 4 represents a part of FIG. 3 on an enlarged scale.

Similar results are obtained when use is made of auxiliary members as shown in FIG. 1. FIG. 4 serves for further explanation. The reference numerals in FIG. 4 have the same meanings as those in FIG. 3.

The invention was explained with reference to an example in which objects are secured having a rectangular bottom face to be glued. Corresponding results are obtained with the use of differently shaped bottom faces, for example, circuit faces. The auxiliary members can be matched thereto in a simple manner.

What is claimed is:

1. An auxiliary member for use in joining together by a thermosetting epoxy glue, two objects of different thermal coefficients of expansion, said member comprising a foil of a lead-tin alloy coated on both sides with an inner film of copper and an outer film of nickel.

2. The auxiliary member of claim 4 wherein the foil has a thickness of between about 0.1 mm. to 1 mm.

3. The auxiliary member of claim 4 wherein the foil has a thickness of between about 0.1 mm. and 0.20 mm.

4. An auxiliary member for use in joining two objects of different coefficients of thermal expansion by a thermosetting glue, said member consisting essentially of a foil of a metal selected from the group consisting of lead, tin, zinc, bismuth and alloys of said metals capable of creeping under a load of about 1 kg./cm.$^2$ at ambient temperatures, which foil carries directly on each of its surfaces at least one thin layer of a metal selected from the group consisting of copper, nickel, chromium, aluminum and silver.

References Cited

UNITED STATES PATENTS

| 1,614,303 | 1/1927 | Humphries | 29—199 X |
| 1,635,320 | 7/1927 | Heany | 29—199 X |
| 2,128,550 | 8/1938 | Ford | 29—199 X |
| 2,270,404 | 1/1943 | Bitter | 29—199 |
| 2,664,844 | 1/1954 | Siegrist | 228—56 |
| 2,730,135 | 1/1956 | Wallace | 228—56 X |
| 3,030,703 | 4/1962 | Wirsing | 228—56 X |

HYLAND BIZOT, *Primary Examiner.*